(12) United States Patent
Krijgsman

(10) Patent No.: US 6,241,953 B1
(45) Date of Patent: Jun. 5, 2001

(54) THERMAL REACTOR WITH SELF-REGULATING TRANSFER MECHANISM

(75) Inventor: Pieter Krijgsman, Wapenveld (NL)

(73) Assignee: Ceramic Oxides International B.V. (NL)

( * ) Notice: Subject to any disclaimer, the term of this patent is extended or adjusted under 35 U.S.C. 154(b) by 0 days.

(21) Appl. No.: 09/337,483

(22) Filed: Jun. 21, 1999

(51) Int. Cl.$^7$ ..................................................... F28D 21/00
(52) U.S. Cl. .................... 422/208; 422/111; 422/112; 422/242; 137/14; 137/572
(58) Field of Search ..................................... 422/110, 111, 422/112, 208, 242; 137/14, 571, 572, 210

(56) References Cited

U.S. PATENT DOCUMENTS 4,131,638 * 12/1978 Whitaker et al. ..................... 264/333

* cited by examiner

Primary Examiner—Hien Tran
Assistant Examiner—Basia Ridley
(74) Attorney, Agent, or Firm—Skjerven Morrill MacPherson LLP; George Wolken, Jr.

(57) ABSTRACT

A reaction product is formed and transferred from an autoclave to a receiving vessel at a laminar flow rate, using a self-adjusting transfer mechanism. A specific amount of water in the receiving vessel is heated and vaporized prior to the reaction product transfer to raise the pressure in the receiving vessel to saturation pressure. A flow passage between the autoclave and the receiving vessel is now opened, and a resulting pressure differential between the autoclave and the receiving vessel initiates the transfer process. A heat exchanger cools the reaction product flowing from the autoclave to the receiving vessel, where the amount of cooling is dependent upon the transfer rate of the reaction product. An increased transfer rate will cause the hotter reaction product entering the receiving vessel to increase the pressure inside the receiving vessel, thereby reducing, or self-adjusting, the transfer rate. The heat exchanger may also generate steam which is fed into the receiving vessel to adjust the pressure in the receiving vessel and thus adjust the transfer rate of the reaction product.

12 Claims, 3 Drawing Sheets

THERMAL REACTOR WITH SELF-REGULATING TRANSFER MECHANISM

BACKGROUND OF THE INVENTION

1. Technical Field

This invention relates to the formation of reaction products such as ceramic, magnetic, electrolyte, electrode and other powders, to the use of high temperatures to disintegrate unwanted compounds, and to a structure employed for these purposes which may operate at near critical, critical or supercritical temperatures and the corresponding saturated pressures of the working fluids.

2. Description of the Related Art

In my earlier U.S. Pat. Nos. 4,238,240, 4,366,121, 4,545,970, 4,753,787, 4,912,078, 4,983,374 and 5,026,527, I describe numerous structures and processes for forming reaction products. These patents are hereby incorporated by reference.

In my '240 patent I disclose a method for forming a reaction product in which the reaction constituents are mixed in an autoclave. The mixed reaction constituents are then reacted for a selected time to form reaction products, and the reaction products are transferred, at the end of the reaction, from the autoclave to another vessel (sometimes called a "receiving vessel" and sometimes called an "antipressure vessel") connected to the autoclave by a flow passage. The pressure in the vessel is held in a controlled manner beneath the pressure in the autoclave during the transfer of the reaction products from the autoclave to the vessel. To maintain the pressure in the vessel in a controlled manner beneath the pressure in the autoclave during the transfer of the reaction products from the autoclave to the receiving vessel, I disclose an electronic control system which measures the pressures in the autoclave and the receiving vessel and which opens or closes a valve (shown as valve 101 in FIG. 1 of the '240 patent) attached to the receiving vessel (vessel 12 in the '240 patent) to maintain the pressure in the vessel a controlled amount beneath the pressure in the autoclave (shown as autoclave 10 in the '240 patent).

I also disclose an alternative embodiment in the '240 patent wherein the electronic control system is replaced by a throttle valve or by a valve and a vent pipe. Before the start of the transfer operation, a suitable pressure difference is established between the autoclave and the receiving vessel. Then, to start the transfer of the reaction product from the autoclave to the antipressure vessel, a valve between the autoclave and the vessel is opened and simultaneously or subsequently, as desired, a pressure release valve on the top of the receiving vessel is opened and left open during the transfer process. As a result, the reaction product from the autoclave flows into the receiving vessel at an instantaneous rate determined by the instantaneous pressure difference between the autoclave and the receiving vessel. As I disclose in the '240 patent, this pressure difference is controlled by the sizes of the valve and vent pipe or the setting of the throttle valve. This embodiment avoids the use of a control circuit but has the potential disadvantage that the transfer is not as precisely controlled as with a control circuit.

In my '787 patent, I provide a substantially simplified system for transferring the contents of the autoclave (shown as autoclave 10 in the '787 patent) to the antipressure vessel (shown as vessel 12 in the '787 patent). The system of that invention incorporates a pressure release valve on the antipressure vessel, the setting of which is precisely controlled by a control signal from a flow meter used to measure the volumetric flow of the reaction product. In the preferred embodiment, the pressure release valve is controlled to maintain a constant flow of reaction product from the autoclave to the antipressure vessel. A novel method of initializing the pressure in the antipressure vessel is disclosed in the '787 patent whereby gas (typically steam) is released from the autoclave through a vent pipe into the antipressure vessel prior to the transfer of reaction product from the autoclave to the antipressure vessel. When the pressure in the antipressure vessel is equal to the pressure in the autoclave, the vent pipe is closed and the pressure in the antipressure vessel falls slightly beneath the pressure in the autoclave as a result of the natural cooling of the gas in the antipressure vessel due to heat transfer to the relatively cooler walls of the antipressure vessel. As the antipressure vessel comes to a relatively steady state temperature after several batches of reaction product have been passed to the vessel, the pressure difference between the autoclave and the vessel due to this natural cooling effect becomes less. And, when the gas is steam, relatively little steam condenses to create this pressure difference. This method and structure avoids the use of costly compressors as in the prior art to initialize the pressure in the antipressure vessel. When the gas is steam, the method requires a surprisingly small amount of steam from the autoclave to pressurize the antipressure vessel due to the fact that the steam in the autoclave is at a high pressure and temperature and, therefore, contains a low volume of water per cubic meter. However, this embodiment has the disadvantage of requiring a flowmeter and expensive monitoring equipment in order to trigger a pressure relief valve if, for example, the flow enters the turbulent regime.

SUMMARY

In accordance with the present invention, I provide a substantially streamlined system for transferring the contents of an autoclave to a receiving vessel, even with respect to the earlier system embodied in my '787 patent. This invention employs a self-siphoning method for effecting the transfer. In the preferred embodiment, this is accomplished by introducing a certain amount of water into a preheated receiving vessel, prior to the transfer of the autoclave contents, where the temperature of the receiving vessel is below the temperature of the autoclave contents. The quantity of water added to the receiving vessel is calculated, taking into account the temperature of the receiving vessel, to be sufficient to yield a saturated vapor pressure in the receiving vessel. Heating the receiving vessel may then be stopped.

An initial pressure difference now exists between the receiving vessel and the autoclave. The reaction product slurry in the autoclave is then transferred via a pipe and heat exchanger(s) to the receiving vessel due to this initial pressure difference. An increased rate of transfer through the heat exchanger(s) causes the temperature of the reaction product slurry entering the receiving vessel to rise. The slurry entering the hot receiving vessel generates more steam and pressure at a higher slurry temperature than at a lower slurry temperature. Since an increased transfer rate causes the pressure within the receiving vessel to rise, which in turn lowers the transfer rate, the present system maintains a self-adjusted pressure difference between the two vessels to control the transfer rate of the slurry.

Additionally, a two-stage heat exchanger is preferably used, where a first heat exchanger acts as a steam generator by converting an externally supplied flow of water into steam as the water cools the hot slurry from the autoclave. This steam is supplied to the receiving vessel to additionally control the pressure differential between the two vessels. The flow rate of cooling water through the steam generator is used to vary the temperature of the steam generated (a higher flow rate of cooling water gives a lower steam temperature) and the temperature of the slurry, where a lower steam temperature reduces the pressure in the receiving vessel so as to increase the slurry flow rate. A higher steam temperature will raise the pressure in the receiving vessel and slow down the slurry flow rate.

The self-adjusting and self-siphoning reaction system described allows the autoclave to discharge the slurry at a desired flow rate without the prior art requirement of continuously monitoring and controlling the flow rate of reaction product and the relative pressures of the autoclave and receiving vessel.

This invention will be more fully understood in conjunction with the following detailed description taken together with the attached drawings.

DETAILED DESCRIPTION

The following detailed description is intended to be illustrative only of selected embodiments of the invention and not to limit the invention.

Figure 1:
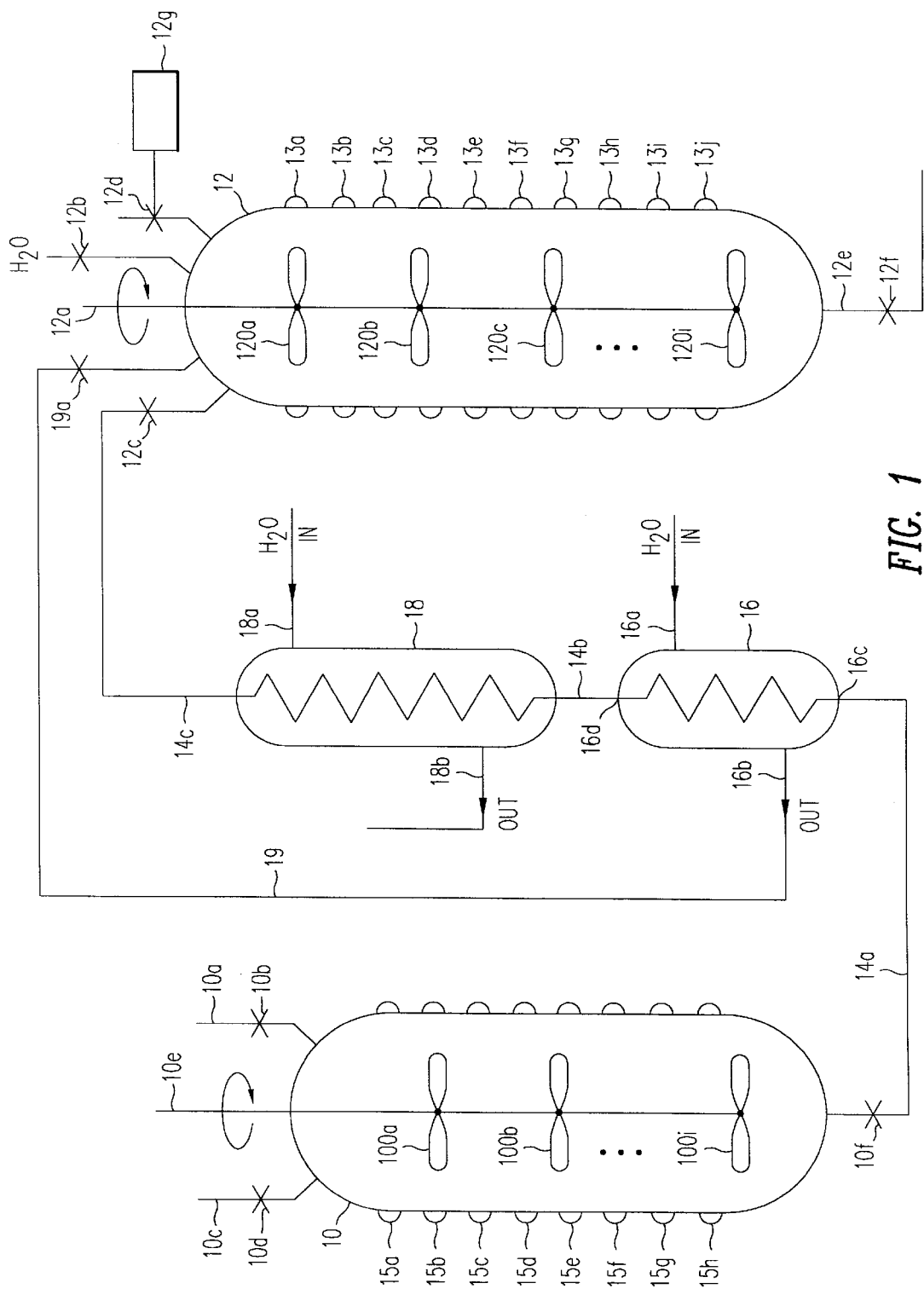
FIG. 1 illustrates an autoclave and a receiving vessel interconnected in accordance with the principles of this invention.

As will be apparent from a comparison of the present FIG. 1 with FIG. 1 of the '787 patent, the system of this invention for the formation of a reaction product is substantially changed from that disclosed in the '787 patent.

In the present FIG. 1, an autoclave 10 is used which, in the preferred embodiment, is made of a fine grain carbon steel, such as WB36 or 15 Ni Cu Mo Nb 5 from Thyssen Stahl AG, of Duisburg, Germany, and cladded with a layer of nickel or stainless steel, such as AISI 316 Ti.

The minimum layer thickness of the stainless steel cladding should be about 3 mm. For particular applications, such as the manufacture of precisely grown crystals, the cladding layer is preferably nickel. This nickel layer can be applied by electrodeless plating or electrode deposit techniques. The thickness of this nickel layer may be in the range of 125 to 150 microns. Such a thin layer of nickel reduces the heat-transfer losses to virtually zero.

The limitations of chemical nickel deposits in a corrosive atmosphere are those inherent in any thin protective film over a substrate where the film is susceptible to attack. Specifically, almost all inorganic acids and short-chain carboxylic acids exhibit penetration rates which are too large for practical use of electrodeless coatings. This is equally true for materials forming soluble nickel complexes such as cyanides, ammonias, short-chain organic amines, many mono- and polyhydroxycarboxylic anions, etc., and for some neutral compounds yielding highly corrosive hydrolysis products. The same limitations apply, of course, to an electroplated nickel coating, except that as the thickness of the nickel coating is increased, the nickel coating may be more economically applied by electrodeposition.

Plate made by electrodeless deposition, which is relatively brittle, is not recommended in applications where flexing or resistance to violent shocks is required.

Chemical nickel deposition should not be used to plate parts which are to be welded. Welds made on plated areas may be embrittled by phosphorous from the plating entering the weld. Also, the plating usually develops a crack pattern which destroys the protective value of the nickel-alloy film.

Catalytic reduction plating, having a low hothardness, should not be used in cases where both wear and heat are involved.

Ordinarily, chemical nickel coating is more expensive than electrodeposition primarily because the reducing agent, namely, sodium hypophosphite, is more costly than electric power. In some specific applications, for instance, the lining of large tanks, the opposite may be true, especially for thinner coatings.

The nickel coating is able to sustain high alkali environments, and the coating can be used at up to 700° C. provided that heating up and cooling down of the autoclave 10 are controlled in order to avoid the formation of microcracks due to thermal shock.

The preferred carbon steel construction of autoclave 10 offsets the low heat transfer coefficient of stainless steel alone. Thus, the time for heating up and cooling down can be reduced advantageously. Furthermore, a fine grain carbon steel, such as WB36, has a tensile strength which diminishes only 12% between 100° C. and 350° C., and a maximum of 28% between 100° C. and 450° C., a regime wherein stainless steel's tensile strength drops dramatically, necessitating thick stainless steel autoclave walls and exacerbating the heating/cooling time problem. Table I provides data on the tensile strength of WB36 or 15NiCuMoNb5 at various thicknesses and temperatures.

TABLE I

Data of Tensile Strain at Elevated Temperatures

| Shell | | $R_{p\,0.2}$ at temperature ° C.* | | | | | | |
|---|---|---|---|---|---|---|---|---|
| Thickness mm | Sample Direction | 100 | 150 | 200 | 250 | 300 | 350 | 400 | 450 |
| | | | | | Newtons/mm² | | | | |
| ≦50 | transverse | 422 | 412 | 402 | 392 | 382 | 373 | 343 | 304 |
| >50–≦100 | | 402 | 392 | 382 | 373 | 363 | 353 | 333 | 304 |
| >100–≦125 | | 392 | 382 | 373 | 363 | 353 | 343 | 324 | 294 |
| >125–≦150 | | 382 | 373 | 363 | 353 | 343 | 333 | 314 | 284 |
| >150–≦300 | | 373 | 363 | 353 | 343 | 333 | 323 | 304 | 274 |

*$R_{p\,0.2}$ = 0.2% elasticity boundary condition of fine grain carbon steel WB 36 or 15 NiCuMoNb 5.

Carbon steel alone not only suffers an incrustation problem but is also unable to withstand the expected acid pH range (0<pH<7) or alkali pH range (7<pH<14), whereby such acidic or alkali media would attack the carbon steel. This is effectively remedied by the cladding with nickel or stainless steel.

As previously stated, it is recommended that the inside of the fine grain carbon steel vessel be cladded with stainless steel to a thickness of 3 mm. On the other hand, there are certain reactions that are carried out under extreme alkali conditions leading to leaching of the stainless steel cladding where those impurities are consequently leading to an undesired, contaminated end product, as is the case with, for example, Nickel Zinc Ferrite, which is used as a magnetic ceramic for application in the high frequency telecommunications and computer data storage. This can be overcome by coating the inside of the autoclave 10 wall with a layer of nickel through well known electrodeless and electrode deposit techniques.

Referring back to FIG. 1, autoclave 10 has a pressure outlet port 10a controlled by pressure release valve 10b and an inlet port 10c controlled by valve 10d, both valves being of a type well known in the art. An agitator 10e has a plurality of paddles 100a, 100b to 100i where i is an integer equal to the maximum number of paddles used with agitator 10e. The blades on the paddles are preferably of the Interprop® type supplied by Ekato Corporation of Germany. The Interprop® mixing blades achieve a greater heat transfer from the wall of autoclave 10 into the suspension at a lower energy consumption. In FIG. 1, three paddles are shown on agitator 10e; however, a different number of paddles can be used if desired based upon experimental results. Agitator 10e is, in accordance with one embodiment of this invention, a variable speed agitator with a speed which varies from 30 rpm to 240 rpm. Of course, these speeds can also be changed if desired to achieve appropriate results depending upon the reaction product desired.

Autoclave 10 is heated by the use of a thermal oil of well known constituents. The thermal oil is first heated in a thermal oil boiler (not shown but well known in the arts) and is then pumped through hollow semicircular coils wound in a plurality of banks on the outer surface of autoclave 10. FIG. 1 shows eight cross-sections 15a through 15h of one bank of such semicircular coils. Typically, four banks of coils are used, and one bank contains eight (8) spirals of heating coils which pass the thermal oil in one direction. The adjacent bank also contains eight (8) spirals of heating coils but passes thermal oil in the other direction. The use of the plurality of banks of coils minimizes the temperature drop of the heating oil in any one bank to ensure that the surface of autoclave 10 is fairly uniformly heated in the steady state. In one embodiment, the temperature drop of the heating oil from the inlet to the outlet of the bank is kept to less than twenty degrees celsius. This small temperature drop coupled with the use of the agitators allows the temperature of the reaction product in autoclave 10 to be kept substantially uniform within about ±5° C.

Agitator 10e within autoclave 10 is controlled to mix the reaction product within autoclave 10 to ensure substantially uniform temperature throughout the reaction product. As a result, the crystal growth of the reaction product within autoclave 10 is also controlled to be substantially uniform.

Autoclave 10 in FIG. 1 also includes an outlet valve 10f connected to an outlet line or pipe 14 (composed of sections 14a, 14b, and 14c). Outlet line 14 passes the reaction product from autoclave 10 through two heat exchangers 16 and 18. Heat exchanger 16 contains an inlet 16a and an outlet 16b for the passage of a fluid, such as water, into a secondary portion of heat exchanger 16 to withdraw heat from the reaction product flowing through line 14a. In the preferred embodiment, heat exchanger 16 is used to generate steam, to be explained later, and will hereinafter be referred to as steam generator 16.

The reaction product flowing through line 14a passes into steam generator 16 at inlet 16c and out from steam generator 16 through outlet 16d.

Figure 2:
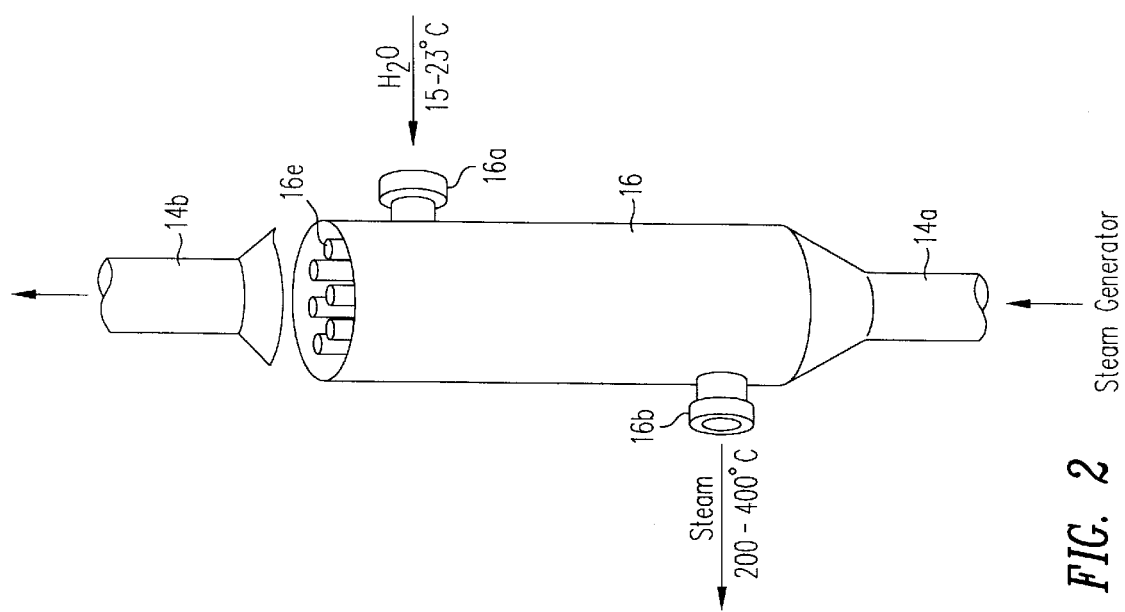
FIG. 2 illustrates a heat exchanger to generate steam used in the preferred embodiment of the invention.

FIG. 2 illustrates one embodiment of steam generator 16. Steam generator 16 cools the reaction product flowing into the primary portion of steam generator 16 such that the reaction product exiting steam generator 16 is, for example, 50° C. cooler than the reaction product entering steam generator 16. To cool the reaction product as it flows through steam generator 16, a low temperature liquid, such as water, at a temperature of, for example, 15° C. enters into a top portion of steam generator 16 via inlet 16a. This cool water entering steam generator 16 flows around a plurality of internal pipes or tubes 16e formed of, for example, stainless steel, through which the reaction product flows.

Steam generator 16 is designed so that the cool water entering inlet 16a accepts enough heat from the reaction product to exit as steam having a temperature of, for example, 200° C.–400° C. via outlet 16b.

To maintain a laminar flow through lines 14a and 14b, the cross-sectional areas of lines 14a and 14b should be approximately the same as the sum of the cross-sectional areas of tubes 16e so that steam generator 16 will not present a flow resistance to the reaction products. Of course, consideration must also be given to other factors, well known to those skilled in the art, such as friction between the reaction product and tubes 16e, to maintain a laminar flow.

As will be described later, the steam exiting from outlet 16b is supplied to a receiving vessel 12 so as to make use of the energy in the steam and to control the pressure in receiving vessel 12.

Preferably, steam generator 16 uses a counter-flow of cooling fluid, whereby the cool fluid enters near the cooled reaction product exit portion 16d of steam generator 16, and the steam exits near the hotter reaction product entrance portion 16c of steam generator 16 so as to minimize mechanical stresses within steam generator 16 due to temperature differences.

The calculations which one may use to design steam generator 16 are given in the example below. For the sake of simplicity, it is considered that the slurry contains 100% water, when actually the slurry has about a 10% solids content. Accurate calculations, however, require that the energy of the solids be taken into consideration, but the deviation in the final results is not very significant.

Assume autoclave 10 has a volume of 6000 liters, and a reaction product fills 80% of this total volume, equalling 4800 liters or kilograms of reaction product.

Assume this amount has to be transferred to receiving vessel 12 within 20 minutes or 1200 seconds. Then the flow rate of reaction product must be:

$$4800 \text{ kgs}/1200 \text{ sec} = 4 \text{ kg·sec}^{-1} \quad \text{(eq. 1)}$$

Steam generator 16 is a counterflow type and the following coolant/reaction product input/output temperatures apply:

$$T_{slurry\ in}\ 250° \text{ C.} = 524 \text{ K}$$

$$T_{slurry\ out}\ 200° \text{ C.} = 474 \text{ K}$$

$$T_{cooling\ in}\ 15° \text{ C.} = 289 \text{ K}$$

$$T_{steam\ out}\ 200° \text{ C.} = 474 \text{ K}$$

$$U = 0.825 \text{ kW·m}^{-2}\text{·K}^{-1}, \quad \text{(eq. 2)}$$

where U is the heat transfer coefficient of steam generator 16, as determined by its stainless steel construction, where m is meters, and K is Kelvin.

Given the above assumptions, steam generator 16 is required to cool the 4 kg·sec$^{-1}$ slurry from 524 K to 474 K by means of X kg·sec–1 cooling water entering inlet 16a at 289 K and leaving outlet 16b as steam at 474 K. The heat transfer constant of steam generator 16 is 0.825 kW·m$^{-2}$·K$^{-1}$.

The constant heat load of the slurry is:

Heat load $Q=4$ kg·sec$^{-1}$·4.18 kW·sec·kg$^{-1}$·K$^{-1}$(524 K−474 K)=836 kW. (eq. 3)

The flow (X) of cooling water entering inlet 16a is calculated as follows:

836 kW=$X$ $kg·sec^{-1}$·4.18 kW·sec·kg$^{-1}$·K$^{-1}$ (474 K−289 K) (eq. 4)

Therefore, $$X = \frac{836 \text{ kW}}{4.18 \text{ kW} \cdot \text{sec} \cdot \text{kg}^{-1} \cdot \text{K}^{-1} \cdot 185 \text{ K}}$$ (eq. 5)

$= 1.1$ kg·sec$^{-1}$ of cooling water.

Therefore, in 20 minutes (1200 secs), 1320 kgs (1200 sec·1.1 kg·sec$^{-1}$) of cooling water are required. The 1320 kgs of water leave steam generator 16 as steam at a temperature of 474 K and a saturated steam pressure of 1.55 Megapascals (MPa) (15.5 bars). The above simplified calculations ignore the nonlinearity of water temperature versus heat absorbed when changing phase from liquid to steam.

According to the standard tables of properties of water and steam in SI-units, the volume of 1 kg steam at 1.55 MPa equals 0.1275 m$^3$. Therefore, 1320 kgs of steam has a volume of 1320×0.1275=168.3 m$^3$.

As previously discussed, the steam exiting steam generator 16 from outlet 16b is fed into receiving vessel 12, which is preheated to approximately the temperature of the steam leaving steam generator 16. If receiving vessel 12 has a volume of 8 m$^3$ (8000 liters) and it was filled with air to 2.0 MPa (20 bars) pressure, then receiving vessel 12 would require 8×20 bars"160 m$^3$ of air. This is virtually the same as the total volume of steam generated by steam generator 16.

In order to initiate a flow of reaction product from autoclave 10 to receiving vessel 12, a pressure difference (ΔP) is required. The following equation applies:

$P_r - \Delta P = P_s$, (eq. 6)

where $P_r$=reaction pressure in autoclave 10 in MPa

ΔP=pressure difference in MPa $P_s$=saturated steam pressure in receiving vessel 12 in MPa Transfer always should take place under laminar conditions (Reynolds Number≦2000), usually not exceeding 0.4 MPa (4 bars) pressure difference between autoclave 10 and receiving vessel 12, however, the pressure difference could be as high as 1.0 MPa (10 bars) in the case the viscosity of the slurry is high. The latter could be the case in the event the solids content in autoclave 10 is high or reaction times have exceeded a certain time, leading to an increase of viscosity, thus requiring a high pressure difference to enable a proper discharge from autoclave 10, through steam generator 16, through heat exchanger 18, and into receiving vessel 12.

Nevertheless, assuming ΔP=0.4 MPa (4 bars), this would mean that the pressure in receiving vessel 12 should be about 4 bars below the saturated steam pressure in autoclave 10. Since at 250° C. autoclave 10 will have an internal pressure of about 4 Mpa (40 bars), a pressure of 3.6 MPa (36 bars) in receiving vessel 12 is a minimum requirement.

The logarithmic mean ($\theta_m$) temperature difference between the slurry and the cooling water is calculated to be:

$$\theta_{1(slurry)} = 50\left\{\frac{524 \text{ K}}{474 \text{ K}}\right\}$$ (eq. 7)

$$\theta_{2(water)} = 185\left\{\frac{474 \text{ K}}{289 \text{ K}}\right\}$$

$$\theta_m = \frac{\theta_1 - \theta_2}{\ln\left(\frac{\theta_1}{\theta_2}\right)} = \frac{50 - 185}{\ln\left(\frac{50}{185}\right)} = 103.2 \text{ K}$$

The total surface area (A) of the high pressure steam generator 16 required in order to lower the temperature of the slurry from 524 K to 474 K while raising the temperature of the coolant water from 289 K to 474 K is:

$$Q = AU\theta_m \Rightarrow A = \frac{Q}{U\theta_m} \Rightarrow \frac{836}{0.825 \cdot 103.2} = 9.8 \text{ m}^2$$ (eq. 8)

where Q is heat load in kW (previously calculated);

A is the surface area (m$^2$) of steam generator 16; and

U is the heat transfer coefficient (W·m$^{-2}$·K$^{-1}$) of the steam generator 16 material (stainless steel).

Assume the inner diameter of the high pressure line 14a connecting the bottom of autoclave 10 with the intake port 16c of steam generator 16 is 0.148 m. The cross-sectional area of line 14a thus equals $\pi r^2$ or $\pi \cdot 0.074^2 = 1.72 \cdot 10^{-2} \cdot \text{m}^2$. (eq. 9)

Assume the cross-sectional area of one tube 16e in steam generator 16 is 3.14·10$^{-4}$·m$^2$ (i.e., 0.02 m inner diameter). This means one would need $$\frac{1.72 \cdot 10^{-2}}{3.14 \cdot 10^{-4}} \approx 55$$ (eq. 10)

tubes 16e to get the same total cross-sectional area of tubes 16e as the cross-sectional area of line 14a. The total surface area (A) was calculated to be 9.8 m$^2$ and the outside circumference of each tube 16e is assumed to be 7.86·10$^{-2}$m (i.e., 0.025 m outer diameter). From that data the total length of tubes 16e can be calculated:

$$\frac{9.8}{7.86 \cdot 10^{-2}} = 125 \text{ meters}$$ (eq. 11)

Since the minimum number of tubes 16e is 55, each individual tube 16e length is:

125/55=2.27 meters (eq. 12)

Thus, given the above assumptions and calculations, team generator 16 of FIG. 2 will be approximately 3.27 including two semispherical heads) meters in length and contain 55 tubes 16e.

Figure 3:
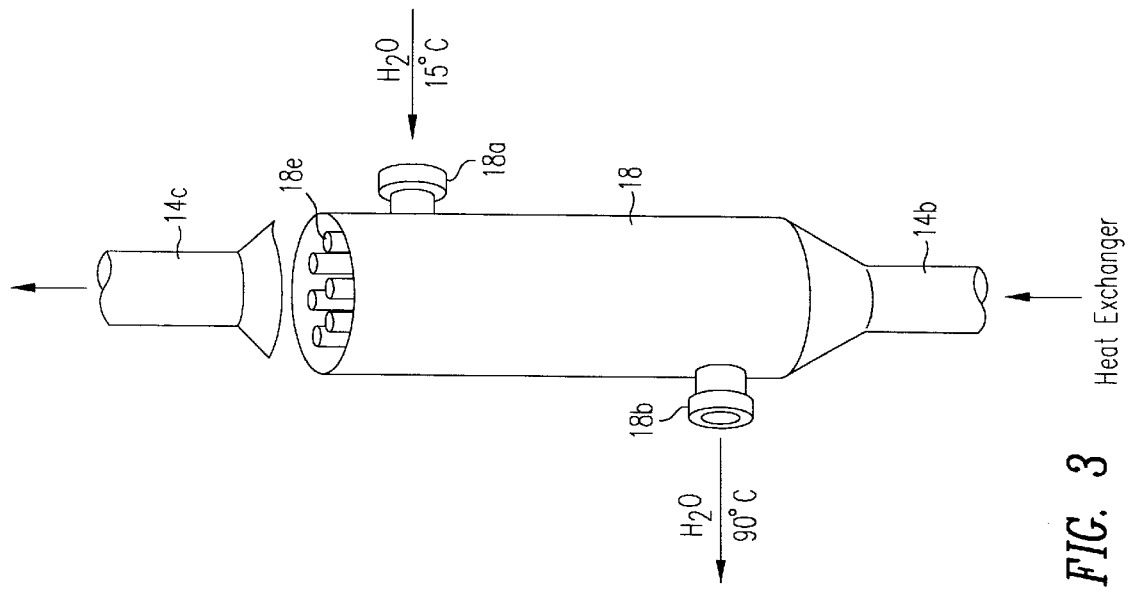
FIG. 3 illustrates a heat exchanger to further cool the reaction constituents before entering the receiving vessel.

From outlet 16d of steam generator 16, the reaction products flow through pipe 14b and into a second heat exchanger 18 (FIG. 3). Heat exchanger 18 includes a coolant inlet 18a and a hot water outlet 18b.

This second heat-exchanger 18 is similar in its general construction to steam generator 16 of FIG. 2; however, it requires a different total area as calculated below. Assume the following conditions:

$T_{slurry\ in}$ 200° C.=474 K $T_{slurry\ out}$ 100° C.=374 K $T_{cooling\ in}$ 15° C.=289 K $T_{cooling\ out}\ 90°\ C.=364\ K$ $U=0.825\ kW\cdot m^{-2}\cdot K^{-1}$ Heat-exchanger 18 is required to cool 4 kg·sec$^{-1}$ slurry from 200° C. (474 K) to 100° C. (374 K) by means of X kg·sec$^{-1}$ cooling water entering at 15° C. (289 K) and leaving as hot water at 90° C. (364 K). The heat load Q is calculated to be:

Heat load $Q=4\ kg\cdot sec^{-1} 4.18\ kW\cdot sec\cdot kg^{-1} K^{-1}(474\ K-374\ K)$  (eq. 13)

or $Q=1672\ kW.$

The amount of cooling water is calculated as follows:

$$1672 = X \cdot 4 \cdot 18(364-289) \Rightarrow X = \frac{1672}{4.18 \cdot 75}$$ (eq. 14)

$$= 5.3\ kg\cdot sec^{-1}$$

In 20 minutes (1200 sec), $1200 \times 5.3 = 6,360\ kgs$  (eq. 15)

The logarithmic mean temperature difference θm is:

$$\theta_{1(slurry)} = 110\left\{\frac{474}{364}\right\}$$ (eq. 16)

$$\theta_{2(water)} = 75\left\{\frac{364}{289}\right\}$$

$$\theta_m = \frac{110-75}{\ln\left(\frac{75}{110}\right)} = 91.4\ K$$

The total surface area of heat exchanger 18 is therefore:

$$A = \frac{Q}{U\cdot \theta_M} = \frac{1672}{0.825 \cdot 91.4} = 22.2\ m^2$$ (eq. 17)

Using the same type tubes as in steam generator 16, the total length of the required tubes would be:

$$\frac{22.2}{7.86 \cdot 10^{-2}} = 281\ meters$$ (eq. 18)

Since the same number (55) of tubes in steam generator 16 is needed in heat exchanger 18, the total length of each tube in heat exchanger 18 is:

$$\frac{281}{55} = 5.1\ meters$$ (eq. 19)

Thus, given the above assumptions and calculations, heat exchanger 18 of FIG. 3 will be approximately 6.1 meters in length (including two semi-spherical heads) contain 55 tubes.

The cooled slurry exiting heat exchanger 18 flows into line 14c. Line 14c is connected to receiving vessel 12 via valve 12c.

Vessel 12, like autoclave 10, contains an agitator 12a containing a plurality of paddles 120a, 120b . . . through 120i, where i is an integer representing the number of paddles on agitator 12a. The blades of paddles 120 are also preferably the Interprop® type from Ekato Corporation of Germany. One embodiment of this invention uses four such paddles 120 although, again, the number of paddles used can be determined empirically depending upon the quality desired for the resulting product.

Vessel 12 is heated by thermal oil with FIG. 1 showing ten cross-sections 13a through 13j of the semicircular coils through which the thermal oil is pumped. In one embodiment, this thermal oil is pumped at a rate substantially higher than for the autoclave 10. The walls of vessel 12 are sized to have a relatively large latent heat capacity to prevent vessel 12 from cooling down too quickly.

Vessel 12 has an outlet 12e with a valve 12f for controlling the removal of material from vessel 12. In addition, a standard valve 12d is provided to relieve the remainder of the pressure in vessel 12 after the total discharge of vessel 12 has taken place. Valve 12d may be controlled by control mechanism 12g.

The self-siphoning mechanism in the preferred embodiment is established by first introducing, via inlet valve 12b, a fixed amount of water necessary to achieve a saturated steam pressure in vessel 12 after vessel 12 is heated. Upon heating by use of the heating coils 13a–13j, the water and vessel 12 will both be at the desired same temperature, with the entire vessel 12 acting as a heat reservoir. Thus, any cooling of vessel 12 will take place slowly and evenly. An initial pressure is now established within vessel 12 which should be less than the pressure in autoclave 10.

In one embodiment, vessel 12 is initially heated to 474 K (200° C.) while the reaction in autoclave 10 is taking place at 524 K (250° C.). The slurry exiting heat exchanger 18 may be approximately 100° C.

Thus, when the cooled reactant leaves heat exchanger 18 and enters into the hot receiving vessel 12, it will immediately start to evaporate, creating a certain amount of pressure within receiving vessel 12 which controls the self-siphoning due to the pressure being less than in autoclave 10. In the preferred embodiment, the pressure so produced is such that the reaction product is transferred through line 14 under laminar flow conditions thereby preventing the crystal structure of the reaction product from degrading.

For safety's sake, pressure transducers placed on the top of autoclave 10 and vessel 12 are also connected to safety control circuits to prevent the inadvertent opening by individuals operating the system of any valves during the reaction process. In addition, safety valves are placed on the top of autoclave 10 and receiving vessel 12 to relieve pressures within these vessels should these pressures exceed safety limits.

A more detailed description of the operation of steam generator 16 and its function in controlling the pressure in receiving vessel 12 will now be described. Assuming the initial temperature of the slurry within autoclave 10 is 524 K, steam generator 16, in one embodiment, may be designed to cool the slurry down to 474 K and produce steam exiting at outlet 16b of steam generator 16 at a temperature of 474 K. A pressure transducer (not shown) connected at the output 16b of steam generator 16 is set at the required pressure to only allow steam to exit. The cool water pumped into the secondary side of steam generator 16 always has a higher pressure than the steam pressure outputted at output 16b of steam generator 16. Thus, once the pressure transducer allows steam to exit from output 16b, water is continually pumped into steam generator 16 so as to provide this continuous generation of steam.

The steam outputted at output 16b is not required to be injected into receiving vessel 12 in order for the self-siphoning effect to take place; however, in the preferred embodiment, this steam is provided to receiving vessel 12 via line 19 and valve 19a. This not only conserves energy and improves the efficiency of the system, but the steam generated by steam generator 16 may be used to keep receiving vessel 12 at a certain pressure just equal to or slightly below the pressure in autoclave 10 to control the flow rate of the reaction product.

For example, it is primarily the temperature of the slurry exiting heat exchanger 18 that sets the requirements for the self-siphoning effect (i.e., the pressure within receiving vessel 12).

In the case where the temperature of the slurry entering receiving vessel 12 becomes too high (for example, above 100° C.), less vapor will condense on the walls of receiving vessel 12, thus maintaining too high a pressure within receiving vessel 12 and thus lowering the transfer speed of reaction product from autoclave 10 to receiving vessel 12. By controlling the flow of water entering steam generator 16 via inlet 16a, the temperature of the slurry may be controlled as well as the temperature of the steam exiting outlet 16b. For example, a greater flow of coolant into inlet 16a will lower the temperature of the slurry exiting steam generator 16 as well as lowering the steam temperature at outlet 16b. This will cause a lowering of the steam temperature and pressure within receiving vessel 12 so as to increase the pressure differential between autoclave 10 and receiving vessel 12 to thus increase the transfer speed of the reaction product from autoclave 10 to receiving vessel 12.

In the event that the flow rate of the reaction product is too great, less water will be pumped into steam generator 16 causing the steam outputted from steam generator 16 to be of a greater temperature and at a higher pressure so as to increase the pressure within receiving vessel 12 and thus slow down the transfer speed of the reaction product.

Heat exchanger 18 is used to lower the temperature of the slurry to a selected temperature so that the resulting reaction product may be held in receiving vessel 12 without the reaction product undergoing any further reaction. Thus, the resulting reaction product may be transferred from receiving vessel 12 via outlet 12e at any later time. Frequently, it may be desired to conduct a secondary reaction process in receiving vessel 12, and thus heat exchanger 18 will be operated accordingly to reduce the temperature of the reaction product to the desired temperature for this secondary reaction process.

Since the temperature of the slurry through heat exchanger 18 is fairly low compared to the temperature of the slurry through steam generator 16, the water exits from the output 18b of heat exchanger 18 as hot water as opposed to steam. This hot water may then be stored for use in a next reaction process within autoclave 10.

When the reaction product has been completely transferred from autoclave 10 to receiving vessel 12, there will still be a residual pressure in autoclave 10 which may exceed 1 MPa or 10 bars. To lower this pressure safely, the flow of water into the secondary portion of steam generator 16 may be stopped while continuing to flow water into the secondary portion of heat exchanger 18 via inlet 18a. By doing so, the vapor pressure in autoclave 10 is reduced to virtually atmospheric pressure, while hot water is being generated by heat exchanger 18 for subsequent batches. A hot water storage vessel (not shown) may store the hot water outputted from output 18b.

The residual hot water which has been outputted by heat exchanger 18 and stored may also be used to provide the initial pressurization of receiving vessel 12 so that less energy is required to be externally supplied to receiving vessel 12 to heat the water to the temperature needed to generate the required initial pressure in receiving vessel 12.

Generally, the maximum temperature drop between the slurry entering and leaving steam generator 16 should not exceed approximately 50° C. By using a separate heat exchanger to generate steam, as opposed to a single heat exchanger which would merely generate hot water, steam generator 16 may be made fairly small so as to withstand very high pressures and temperatures and produce an energy-valuable steam resource which may be used as a control tool in the transfer of reaction products. The specialized use of steam generator 16 enables one to form, using standard materials, a steam generator which may operate at temperatures near critical, at critical, or supercritical temperatures of water. The commercial applications of conducting reactions at such temperatures are known to those skilled in the art. Some applications regarding the destruction of toxic waste are described in the article "Supercritical Water, a Medium for Chemistry," by R. Shaw et al., C&EN, Dec. 23, 1991, incorporated herein by reference. At such high temperatures, a vast amount of energy would be needed to maintain a suitable pressure in reaction vessel 12. However, with steam being generated by steam generator 16 around these temperatures, much less energy is needed to maintain an adequate pressure in reaction vessel 12.

Although water has been specifically mentioned as the coolant for steam generator 16 and heat exchanger 18, and as an ingredient in the reaction process itself, other fluids may be used as would be obvious to those skilled in the art after reading this disclosure.

By increasing the temperature and the corresponding saturated steam pressures in a reactor system to near critical, at critical, or above critical temperatures, the required dimensioning and ruggedness of autoclaves and heat exchangers become extraordinary, and investment costs cannot be balanced against the economic justification of producing fine ceramic crystals resulting from such reaction processes. The two-stage transfer system involving steam generator 16 and heat exchanger 18 avoids the shortcomings ascribed to these reactors in that smaller size heat exchangers are required which are simple to manufacture and are at the same time able to sustain extremely high temperatures and pressures. As a consequence of this, they are far less expensive to manufacture to meet the demands of such a reactor. By introducing the two-stage transfer system, high calorie-rich slurry can be cooled to generate high pressure steam. This steam, in conjunction with preheating the receiving vessel 12 and by partly evaporating the relatively cool slurry leaving heat exchanger 18, leads to a very energy efficient and cost efficient self-siphoning discharge system for the reactor.

One type of reaction product which has been shown to have better performance when formed under supercritical conditions is Nickel Zinc Ferrite for use in, for example, high frequency telecommunications, and computer data storage.

Figure 4:
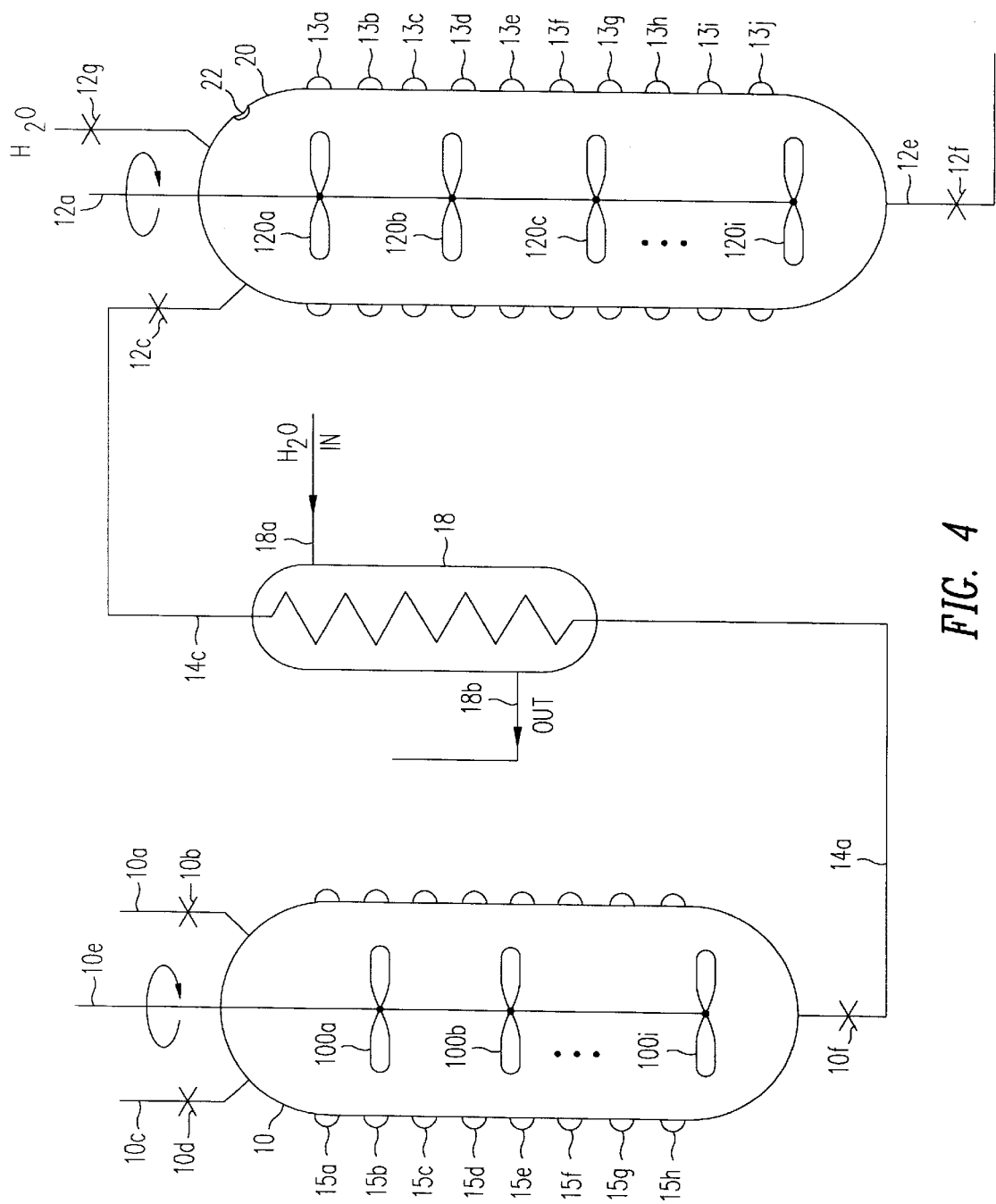
FIG. 4 illustrates an alternative embodiment of a thermal reaction system in accordance with this invention.

An alternative embodiment of the reactor of FIG. 1 is shown in FIG. 4 where, instead of a receiving vessel which is closed, receiving vessel 20 is an open vessel where its internal pressure is maintained at approximately one atmosphere (1 bar). In FIG. 4, vessel 20 is depicted as having an opening 22 being open to the atmosphere. The elements in FIG. 4 which are designated with the same designation as those elements in FIG. 1 have similar structures and functions. However, in FIG. 4, there is no separate steam generator, and heat exchanger 18 must be designed and operated to lower the temperature of the slurry entering line 14a to the desired final temperature of the slurry entering open vessel 20.

Once a reaction has been completed in autoclave 10, valve 10f is opened and the reaction product flows through line 14a and into heat exchanger 18 due to the pressure differential between autoclave 10 and open vessel 20. Due to the large pressure differential, the flow of reaction products through line 14 will be relatively swift, which may make this transfer system unsuitable for those reaction products whose crystal structures would degrade when subjected to rapid changes in temperature and pressure. The system of FIG. 4 may be suitable for processes involving the transformation of a raw material's mineral structure into another mineral structure.

Since the initial rush of reaction product into an empty line 14 may be more rapid than once the reaction product has completely filled line 14, heat exchanger 18 will not adequately cool the reaction product during this initial flow. To slow down the reaction product when it is initially being passed through line 14, so as to sufficiently cool the reaction product by heat exchanger 18, valve 12c is initially closed to form an air block in line 14. When valve 10f is then opened, the back air pressure in line 14 will generate a pressure buildup in line 14 and slow down the flow of reaction product in line 14 so that heat exchanger 18 may adequately cool the reaction product to the final temperature. Once the flow of reaction product is sufficiently low to be adequately cooled by heat exchanger 18, valve 12c is opened so that the flow of reaction product reaches a steady state through line 14 and is cooled by heat exchanger 18 to the desired temperature.

As an example of how to design heat exchanger 18, the below analysis is provided.

Assume the reaction in autoclave 10 will take place at 250° C. and heat exchanger 18 is required to cool the slurry down to 90° C. with a coolant being applied to inlet 18a at 15° C.

Also assume 4800 kgs of slurry are to be discharged in 1200 seconds. The rate is therefore 4 kg·sec$^{-1}$. The initial temperature conditions are:

$T_i$ (reaction) 250° C.=524 K $T_o$ (final temp.) 90° C.=364 K $T_i$ (coolant) 15° C.=289 K $T_o$ (hot water) 90° C.=364 K The heat load Q is calculated to be:

Heat load $Q$=4 kg·sec$^{-1}$·4.18 kW·sec·kg$^{-1}$·K$^{-1}$(524 K−364 K)=2675 kW. (eq. 20)

The rate of cooling water required is:

2675 kW=$X$·4.18 kw·sec·kg$^{-1}$·K$^{-1}$·(364 K−289 K) (eq. 21)

$$X = \frac{2675}{4.18 \cdot 75} = 8.53 \text{ kg·sec}^{-1} \quad \text{(eq. 22)}$$

The mean logarithmic temperature ($\theta_m$) is $$\theta_{1(slurry)} = 160\left\{\frac{524}{364}\right\} \quad \text{(eq. 23)}$$

$$\theta_{2(water)} = 75\left\{\frac{524}{364}\right\}$$

$$\theta_m = \frac{\theta_1 - \theta_2}{\ln\left(\frac{\theta_1}{\theta_2}\right)} = \frac{160 - 75}{\ln\left(\frac{160}{75}\right)} = 112.2 \text{ K}$$

The surface area (A) of heat exchanger 18 is calculated to be:

$$A = \frac{Q}{U\theta_m} = \frac{2675}{0.825 \cdot 112.2} = 29 \text{ m}^2 \quad \text{(eq. 24)}$$

Using the same tubes 16e (FIG. 2) as previously described, the total length of tubes 16e must be:

$$\frac{29}{7.86 \cdot 10^{-2}} = 367.6 \text{ meters} \quad \text{(eq. 25)}$$

The number of tubes 16e will depend on the cross-sectional area of line 14a in FIG. 4.

Assuming line 14a in FIG. 4 is identical with line 14a in FIG. 1, then the individual pipe length is:

367.6/5.5=6.68 meters

The process and structure described above is multi-purpose in the sense that the process and structure can be used to provide a number of different reaction products. Using a hydro/solvo thermal reaction with this invention to form ceramic powders or other substances saves a substantial amount of energy over standard methods for the formation of such ceramic powders. Moreover, the hydro/solvo thermal reaction provides ceramic materials or other substances of substantially uniform crystal size in a powder like form.

The reaction product is formed by controlling the temperature of the reaction constituents within autoclave 10 to within a selected value for a selected period of time at a desired pressure.

As disclosed in a report published by Lawrence Berkeley Laboratory, University of California (LBL-14722), entitled "A Database for Nuclear Waste Disposal for Temperatures up to 300° C.," by Sidney L. Phillips and Leonard F. Silvester, September 1982, the amount of inorganic susbstance in solution can be calculated according to equation 15 set forth in that paper. That equation states that log S (where S is the solubility in water in gram moles per liter) is a function of temperature.

Using that equation, and other equations set forth below, one can calculate the solubility in gmol per liter of reaction constituents dissolved in water at the preferred temperature. As the temperature goes up, the amount of material dissolved also goes up. Accordingly, there is a substantial advantage, not only with respect to solubility but also with respect to controlled crystal growth, to operating autoclave 10 at a higher temperature and pressure than previously considered advisable.

To aid in selecting a process temperature for a specific reaction, the following calculations are provided. The symbols used are defined in Appendix A.

Equilibrium Constants

The database centers on values of equilibrium constants, logK° at 25° C. and zero ionic strength. The chemical equilibria are mostly hydrolysis, complexation and ionization reactions. These intrinsic data are calculated from the equations:

$$\Delta_r G° = 66 \, _r H° - T\Delta S° \quad \text{(eq. 26)}$$

$$\log K° = \frac{-\Delta_r G°}{(2.303)RT} \quad \text{(eq. 27)}$$

Values of $\Delta_r H°$ and $\Delta S°$ for each chemical reaction are calculated from the sum of the $\Delta_f H°$ and $\Delta S°$ of the products, minus this sum for the reactants.

Temperature Effects

Equilibrium quotients are computed from 25–300° C. based on the following equation:

$$RlnQ = \Delta S° - \frac{-\Delta_r H°}{T} + \Delta C_p°\left[\frac{\Theta}{T} - 1 + \ln\left(\frac{T}{\Theta}\right)\right] \quad \text{(eq. 28)}$$

Equation 28 assumes heat capacity change is constant over the temperature range of interest; this assumption is certainly not valid above perhaps 100° C. for the majority of reactions. However, if chemical reactions are written such that both sides of a chemical equation have an equal number of like charges, then constancy of $\Delta C_p°$ is a more tenable assumption. This "balanced like charges" approach and eq. 28 are used in this database to the extent possible. $C_p° = 0$ will be assigned for uncharged aqueous substances such as $U(OH)_4(aq)$. In absence of other data, this assumption is used for this database.

Linearity is improved by writing eq. 28 in the following form, when plotting values of log Q as a function of 1000/T(K):

$$\log K°(T) + \frac{\Delta_r C_p°}{2.303R}\left[\ln\left(\frac{298.15}{T(K)}\right) + 1\right] = A + \frac{B}{T(K)} \quad \text{(eq. 29)}$$

$$A = \frac{\Delta_r S°}{2.303R}$$

$$B = -\frac{1}{2.303R}[\Delta_r H° - 298.15\Delta_r C_p°]$$

Because of the improved linearity, extrapolation can be made to higher temperatures with more confidence with eq. 29. This equation should be used whenever data are available on heat capacity of chemical reactions at 25° C.

A typical prior art process for forming ceramic powders involves melting ingredients at a very high temperature (2800° C.–3000° C.), allowing the melted ingredients to cool in a large block to ambient temperatures, crushing the block into smaller parts, coarsely grinding the smaller parts to yield rough crystals and then finely grinding the rough crystals to yield fine powders. By using my invention, this energy intensive process is totally avoided. My hydro/solvo thermal process will directly produce fine crystal powders. In one preferred method, the hydrothermal reaction takes place at a temperature at, near, equal to, or above supercritical temperatures rather than at several thousand degrees celsius. By controlling the time of reaction, the size of the ceramic crystals can be fairly accurately controlled to the desired dimension.

Thus the process described above yields a substantial improvement in the formation of uniform crystals of reaction products over the prior art both in terms of energy consumed and the uniformity of the resulting structure.

In addition, the prior art grinding procedure yields crystals of nonuniform and differing sizes even though the resulting materials are substantially fine. This creates certain problems in using these crystals to form finished products. In particular, ceramic materials are known to be brittle despite their other desirable characteristics. Because of this shortcoming, ceramic materials find fewer applications in advanced technology than justified by their potential benefits. Thus research is being done to increase the lifetime and prolong the fatigue limits of ceramic materials such that ceramic materials can be used in new applications to replace a variety of metal composites. However, nonuniformity of ceramic crystal size yields a nonuniform bonding force which in itself relates to discrepancies in the atomic structure of the ceramic crystal making up the ceramic materials. Scanning electron microscope (SEM) exposures of ceramic materials show that fatigue starts at those places where there are substantial differences in uniformity of the ceramic crystals. Apparently the bonding energy between nonuniform crystals is unable to find a so-called harmonic neighbor thus leading to spontaneous fatigue because of the differences in the bonding energy between different size crystals within the material. At this stage of the technological development of materials from ceramic crystals, several companies have acquired improved crystal size uniformity obtained using a grinding process but still the uniformity is not sufficient to allow the proven material to be used in high technology applications such as, for example, blades for jet engines. Thus considering these factors, the process of my invention makes possible the fabrication of uniform powders.

The present invention also offers the following advantages over that disclosed in my previous '787 patent. There is no flowmeter for the reaction product required, since the flow of reaction product to the vessel 12 is self-adjusted. Nor is it necessary to install expensive electronic equipment to monitor any flowmeter signal in order to trigger a pressure relief valve on the receiving vessel. There is only a standard relief valve to vent the remaining pressure after total autoclave discharge has taken place. There is no requirement of gas transfer, via a by-pass line, from the autoclave to the receiving vessel prior to the reaction product transfer. The cooled reactant leaving the heat exchanger generates sufficient pressure upon entering the heated receiving vessel that the transfer takes place at a rate such that the flow is near-laminar, given an appropriate matching of the dimensions of the autoclave and receiving vessel. The initial thin film of water on the walls of receiving vessel 12 ensures that vessel 12 will not cool down too rapidly, with its potentially deleterious consequences on the quality of the reaction products. Also, the heating requirements on receiving vessel 12, so as to evaporate the water and generate sufficient vapor pressure, is far less than in my previous invention. Thus, this invention offers tremendous scope for a batch procedure requiring less energy, with a far lower overall investment cost, and simplified procedure ensuring near continuous operation.

My preferred process and system include the following additional structural and functional characteristics:

1. Temperatures of the reaction process are controlled within ±5° C.;
2. Pressure transducers used are preferably sputtered film transducers of a type made available by CEC Corporation in Pasadena, Calif.;
3. Variable speed stirring equipment uses INTERPROP® blades of a type provided by Ekato Corporation of Germany;
4. Reaction products are reproducible as a function of reaction time and temperature;
5. Less energy is used than prior art processes;
6. Many different reaction products are capable of being made with the same system;
7. Higher precalculable solubility for reaction constituents are attained to allow accurate characterization of the process;
8. Autoclave wall size is reduced by the use of WB 36 or 15 Ni Cu Mo Nb 5 from Thyssen Stahl AG, of Duisburg, Germany, cladded with nickel or stainless steel AISI 316 Ti permitting faster heat-up and cool-down, while marginally decreasing the autoclave tensile strength;
9. The system is capable of being economically designed and fabricated so that it may operate near, at, or above critical temperatures.

In view of the above, other embodiments of this invention will be obvious to those skilled in the art.

APPENDIX A

Symbols, Units and Conversion Factors $\Delta_f G°$=Gibbs energy of formation, 25° C., I=0; kJ mol$^{-1}$
$\Delta_f H°$=Enthalpy of formation, 25° C., I=0; kJ mol$^{-1}$ S°=Entropy, 25° C., I=0; J mol$^{-1}$ K$^{-1}$
$C_p$°=Heat capacity, 25° C.; J mol$^{-1}$ K$^{-1}$
$\Delta_r$G°=Gibbs energy of reaction, 25° C., I=0; J mol$^{-1}$
$\Delta_r$H°=Enthalpy of reaction, 25° C., I=0; J mol$^{-1}$
ΔS°=Entropy change for reaction, 25° C., I=0; J mol$^{-1}$ K$^{-1}$
$\Delta C_p$°=Heat capacity change for reaction, 25° C., I=0; J mol$^{-1}$ K$^{-1}$
J=joules; cal=calories
kJ=kilojoules=1000 joules
I=ionic strength, mol kg$^{-1}$
K=273.15+° C., C.=celsius
mol=gram molecular weight
Q=equilibrium quotient, or product
K°=intrinsic equilibrium constant, 25° C., I=0
R=gas constant: 8.3143 J mol$^{-1}$ K$^{-1}$; 1.987 cal mol$^{-1}$
g=gaseous form
s=solid form
am=amorphous form
aq=aqueous form
l=liquid form $$\text{molal} = \frac{(1000)(\text{density})}{(1000)(\text{density}) - (\text{molarity})(\text{molecular weight of salt})}$$

$$\text{molarity} = \frac{(1000)(\text{density})(\text{molarity})}{(1000) + (\text{molecular weight of salt})(\text{molarity})}$$

1 cal = 4.184 J

What is claimed is:

1. A system comprising:
an autoclave for use in forming a reaction product;
a receiving vessel for receiving said reaction product;
a flow passage connecting said autoclave to said receiving vessel, said flow passage being adapted for the transfer of said reaction product from said autoclave to said receiving vessel; and
a structure for transferring said reaction product from said autoclave to said receiving vessel while automatically maintaining a substantially self-regulating transfer rate, wherein an increased transfer rate causes the pressure in said receiving vessel to increase relative to the pressure in said autoclave to thereby reduce the transfer rate of said reaction product wherein said structure for transferring comprises
a heater for said receiving vessel; and
an inlet for adding a prescribed amount of working fluid to said vessel, said working fluid being capable of transforming at least partly into vapor when heated inside said receiving vessel, said vapor generating a pressure in said receiving vessel which is lower than a pressure inside said autoclave so as to initiate self-siphoning of said reaction product from said autoclave into said receiving vessel.

2. The system of claim 1 wherein said working fluid is water.

3. The system of claim 1 further comprising a pressure release valve on said vessel.

4. The system of claim 1 wherein said autoclave is comprised of:
a fine grain carbon steel; and
a stainless steel layer, said stainless steel layer cladding said fine grain carbon steel.

5. The system of claim 4 wherein said fine grain carbon steel comprised of WB36 or 15 Ni Cu Mo Nb 5.

6. The system of claim 4 wherein said stainless steel layer is comprised of AISI 316 Ti.

7. The system of claim 1 wherein said autoclave is comprised of:
a fine grain carbon steel layer; and
a nickel layer cladding said fine grain carbon steel layer.

8. A system as in claim 7, wherein said receiving vessel is at atmospheric pressure.

9. A system comprising:
an autoclave for use in forming a reaction product;
a receiving vessel for receiving said reaction product;
a flow passage connecting said autoclave to said receiving vessel, said flow passage being adapted for the transfer of said reaction product form said autoclave to said receiving vessel; and
a structure for transferring said reaction product from said autoclave to said receiving vessel while automatically maintaining a substantially self-regulating transfer rate, wherein an increased transfer rate causes the pressure in said receiving vessel to increase relative to the pressure in said autoclave to thereby reduce the transfer rate of said reaction product wherein said structure for transferring includes a first heat exchanger connected in series with said flow passage, said first heat exchanger causing a temperature of said reaction product exiting said first heat exchanger to be dependent upon a transfer rate of said reaction product.

10. The system of claim 9 wherein said first heat exchanger generates an amount of steam using heat removed from said reaction product, and said system further comprises a steam passage between said first heat exchanger and said receiving vessel to allow said steam to be used to control a pressure in said receiving vessel.

11. The system of claim 9 further comprising a second heat exchanger connected in series with said flow passage downstream from said first heat exchanger for further lowering a temperature of said reaction product.

12. The system of claim 11 wherein said first heat exchange means is designed to withstand supercritical reaction product temperatures and is designed to lower a temperature of said reaction product to below supercritical temperatures.

* * * * *